United States Patent
Sasaki et al.

(10) Patent No.: US 6,807,722 B2
(45) Date of Patent: Oct. 26, 2004

(54) THIN-FILM MAGNETIC HEAD MATERIAL AND METHOD OF MANUFACTURING SAME AND METHOD OF MANUFACTURING THIN-FILM MAGNETIC HEAD

(75) Inventors: Yoshitaka Sasaki, Tokyo (JP); Hiroyuki Itoh, Tokyo (JP)

(73) Assignee: TDK Corporation, Tokyo (JP)

( * ) Notice: Subject to any disclaimer, the term of this patent is extended or adjusted under 35 U.S.C. 154(b) by 2 days.

(21) Appl. No.: 09/865,445

(22) Filed: May 29, 2001

(65) Prior Publication Data

US 2001/0026947 A1 Oct. 4, 2001

Related U.S. Application Data

(62) Division of application No. 09/391,232, filed on Sep. 7, 1999, now Pat. No. 6,274,222.

(30) Foreign Application Priority Data

Jun. 5, 1998 (JP) ............................................ 10-123718

(51) Int. Cl.⁷ .......................... G11B 5/127; H04R 31/00
(52) U.S. Cl. ................................ 29/603.09; 29/603.01; 29/603.07; 29/603.1; 29/603.15; 29/603.12; 29/412; 29/414; 29/415; 29/417
(58) Field of Search .................. 29/603.01, 603.07, 29/603.09, 603.1, 603.15, 603.12, 414, 415, 417; 83/929.1

(56) References Cited

U.S. PATENT DOCUMENTS 3,710,235 A * 1/1973 Barrager et al. ............... 29/593
4,226,018 A * 10/1980 Nakanishi et al. ........ 29/603.12
5,721,488 A * 2/1998 Sakai et al. .................... 29/593
5,722,155 A * 3/1998 Stover et al. ............... 29/603.1
5,722,156 A * 3/1998 Balfrey et al. ........... 29/603.08
5,738,929 A 4/1998 Maeda et al.
5,821,746 A * 10/1998 Shelor ......................... 324/210
6,103,359 A 8/2000 Doi
6,233,812 B1 * 5/2001 Fujiki et al. .............. 29/603.01

FOREIGN PATENT DOCUMENTS

JP    A-8-287424    11/1996

* cited by examiner

*Primary Examiner*—A. Dexter Tugbang
*Assistant Examiner*—Tai Van Nguyen
(74) *Attorney, Agent, or Firm*—Oliff & Berridge, PLC

(57) ABSTRACT

A manufacturing method is provided for manufacturing a head material including: a plurality of rows of head-to-be sections to be thin-film magnetic heads; an inter-row cutting section provided to be a position at which adjacent ones of the rows are to be separated; and an intra-row cutting section provided to be a position at which adjacent ones of the head-to-be sections in each of the rows are to be separated. The method includes the steps of: providing a detection element to be used for detecting an amount of processing when specific processing is performed on the head material; an electrode for electrically connecting the detection element to an external device; and a conductor for electrically connecting the electrode to the detection element; and forming the electrode in the inter-row section.

2 Claims, 12 Drawing Sheets

THIN-FILM MAGNETIC HEAD MATERIAL AND METHOD OF MANUFACTURING SAME AND METHOD OF MANUFACTURING THIN-FILM MAGNETIC HEAD

BACKGROUND OF THE INVENTION

1. Field of the Invention

The present invention relates to a thin-film magnetic head material including a detection element for detecting an amount of processing and a method of manufacturing such a head material and to a method of manufacturing thin-film magnetic heads through the use of a detection element.

2. Description of the Related Art

A flying-type thin-film magnetic head used for a magnetic disk device and so on is generally made up of a thin-film magnetic head slider (that may be simply called a slider) having a thin-film magnetic head element provided at the trailing edge of the slider. The slider generally comprises a rail whose surface functions as a medium facing surface (an air bearing surface) and a tapered section or a step near the end on the air inflow side. The rail flies slightly above the surface of a recording medium such as a magnetic disk by means of air flow from the tapered section or step.

A thin-film magnetic head element generally used is a composite-type element made up of layers of an induction magnetic transducer for writing and a magnetoresistive (MR) element for reading.

In general, such thin-film magnetic head sliders are formed through cutting a wafer in one direction in which sections to be sliders (called slider sections in the following description) each including a thin-film magnetic head element are arranged in a plurality of rows. A block called a bar in which the slider sections are arranged in a row is thereby formed. Rails are then formed in the bar and the bar is cut into the sliders.

The manufacturing process of the sliders includes a step of processing the medium facing surface of the bar, that is, grinding or lapping the medium facing surface and a step of cutting the wafer into the bars. The order of the step of processing the medium facing surface and the step of cutting the wafer into the bars depends on methods of processing the medium facing surface and cutting the wafer, as described later.

In the step of processing the medium facing surface, it is required that the MR height and the throat height of the thin-film magnetic head element formed in the bar each fall within a tolerance range and that processing accuracy of the surface processed falls within a tolerance range. The MR height is the length (height) between the end of the MR element close to the medium facing surface and the opposite end. The throat height is the length (height) of the magnetic pole of an induction magnetic transducer.

In the step of processing the medium facing surface, in order to precisely control the MR height and throat height of each thin-film magnetic head element included in a bar, one of the methods taken is to form a detection element (that may be called a lapping guide) in a wafer in advance for detecting an amount of processing. A signal outputted from the detection element is monitored during the step of processing the medium facing surface and the processing is controlled with high accuracy, in response to the output signal. The detection element may be a resistance element whose resistance value changes in response to its dimensions.

To monitor a signal outputted from the detection element in the step of processing the medium facing surface, it is required to form an electrode for monitoring and a lead (conductor) for monitoring in the wafer in advance, in addition to the detection element. The electrode is used for electrically connecting the detection element to a controller of an external processing apparatus. The lead is used for electrically connecting the electrode to the detection element.

FIG. 13 shows an example of arrangement of detection elements, and electrodes and leads for monitoring in a wafer used for manufacturing thin-film magnetic heads of related art. In this example, thin-film magnetic head elements 101 are aligned in a plurality of rows in the wafer 100. The head elements 101 each include: an element section 102 including an induction-type magnetic transducer and an MR element; and a plurality of electrodes 103 for electrically connecting the element section 102 to an external device. In the wafer 100 in the example shown in FIG. 13, between every adjacent head elements 101 in each row, there are a detection element 111 for detecting an amount of processing, two electrodes 112a and 112b for monitoring, and two leads 113a and 113b for monitoring that electrically connect the electrodes 112a and 112b to each other.

FIG. 14 shows another example of arrangement of detection elements, and electrodes and leads for monitoring in a wafer used for manufacturing thin-film magnetic heads of related art. This example may be the one disclosed in Japanese Patent Application Laid-open Hei 8-287424 (1996). In this example, as in the example shown in FIG. 13, the detection element 111, the two electrodes 112a and 112b for monitoring, and the two leads 113a and 113b for monitoring are placed between every adjacent head elements 101 in each row in the wafer 100. One of the electrodes 112a is used for grounding and functions as one of the electrodes 103 of the head element 101 as well.

In the example shown in FIG. 13, the detection element 111, the electrodes 112a and 112b, and the leads 113a and 113b are placed between every adjacent head elements 101 in each row. As a result, the pitch of the head elements 101 in each row is increase by the space occupied by the detection element, the electrodes and the leads, compared to a case where none of these is placed between every adjacent head elements. Consequently, the number of thin-film magnetic head elements obtained from a given length of bar is reduced.

In the example shown in FIG. 14, compared to the one shown in FIG. 13, the pitch of the head elements 101 in each row is reduced and the number of thin-film magnetic head elements obtained from a given length of bar is thereby increased. However, in this example, too, the electrode 112b is additionally provided between every adjacent head elements 101 in each row. Therefore, the pitch of the head elements 101 in each row is still greater, and the number of head elements obtained from a given length of bar is reduced, compared to a case where the electrode 112b is not placed. In particular, since the electrode such as the electrode 112b is required to be connected to a bonding wire, it is necessary to maintain the electrode at a certain size. The pitch is therefore further required to be increased. For example, if the diameter of the bonding wire is about 30 $\mu$m, the length of one side of the electrode 112b is required to be about 100 $\mu$m.

In the example shown in FIG. 14, the electrode 112a functions as one of the electrodes 103 of the thin-film magnetic head element 101, too. As a result, if the bar is cut at the detection element 111 for dividing the bar into head elements (sliders), part of the lead for monitoring remains exposed outside. The part of the lead may catch noises and cause static damage.

SUMMARY OF THE INVENTION

It is a first object of the invention to provide a thin-film magnetic head material and a method of manufacturing the same and a method of manufacturing thin-film magnetic heads to increase the number of thin-film magnetic heads to obtain.

It is a second object of the invention to provide a thin-film magnetic head material and a method of manufacturing the same and a method of manufacturing thin-film magnetic heads to fabricate thin-film magnetic heads in which no conductors connected to elements for detecting an amount of processing remain.

A thin-film magnetic head material of the invention includes: a plurality of rows of head-to-be sections to be thin-film magnetic heads; an inter-row cutting section provided to be a position at which adjacent ones of the rows are to be separated; and an intra-row cutting section provided to be a position at which adjacent ones of the head-to-be sections in each of the rows are to be separated. The head material comprises: a detection element to be used for detecting an amount of processing when specific processing is performed on the head material; an electrode formed in the inter-row cutting section for electrically connecting the detection element to an external device; and a conductor for electrically connecting the electrode to the detection element.

In the thin-film magnetic head material of the invention, the electrode connected to the detection element is formed in the inter-row cutting section. As a result, the pitch of the head-to-be sections in each row is reduced.

In the head material the detection element and the conductor may be formed in the intra-row cutting section. In this case, the detection element and the conductor are eliminated when the head material is cut off at the intra-row cutting section.

A method of the invention is provided for manufacturing a thin-film magnetic head material including: a plurality of rows of head-to-be sections to be thin-film magnetic heads; an inter-row cutting section provided to be a position at which adjacent ones of the rows are to be separated; an intra-row cutting section provided to be a position at which adjacent ones of the head-to-be sections in each of the rows are to be separated. The method includes the steps of: providing a detection element to be used for detecting an amount of processing when specific processing is performed on the head material, an electrode for electrically connecting the detection element to an external device, and a conductor for electrically connecting the electrode to the detection element; and forming the electrode in the inter-row cutting section.

According to the method of the invention, the electrode connected to the detection element is formed in the inter-row cutting section. As a result, the pitch of the head-to-be sections in each row is reduced.

In the method the detection element and the conductor may be formed in the intra-row cutting section. In this case, the detection element and the conductor are eliminated when the head material is cut off at the intra-row cutting section.

A method of manufacturing thin-film magnetic heads of the invention is performed through the use of a thin-film magnetic head material including: a plurality of rows of head-to-be sections to be thin-film magnetic heads; an inter-row cutting section provided to be a position at which adjacent ones of the rows are to be separated; an intra-row cutting section provided to be a position at which adjacent ones of the head-to be sections in each of the rows are to be separated. The method includes the steps of: fabricating the head material including: a detection element to be used for detecting an amount of processing when specific processing is performed on the head material, an electrode formed in the inter-row cutting section for electrically connecting the detection element to an external device, and a conductor for electrically connecting the electrode to the detection element; performing the specific processing on the head material while monitoring an output signal of the detection element obtained through the electrode; forming a head aggregate including one of the rows of the head-to-be sections by separating the head material having gone through the step of performing the processing at the inter-row cutting section; and forming the thin-film magnetic heads by separating the head aggregate formed in the step of forming the head aggregate at the intra-row cutting section.

According to the method of manufacturing thin-film magnetic heads of the invention, the head material in which the electrode connected to the detection element is formed in the inter-row cutting section in the step of fabricating the head material. The specific processing is performed on the head material while an output signal of the detection element obtained through the electrode is monitored in the step of performing the processing. In the step of forming the head aggregate, the head aggregate is formed by separating the head material having gone through the step of performing the processing at the inter-row cutting section. The thin-film magnetic heads are formed by separating the head aggregate at the intra-row cutting section in the step of forming the heads.

In the method the detection element and the conductor may be formed in the intra-row cutting section in the step of fabricating the head material. In this case, the detection element and the conductor are eliminated when the head aggregate is cut off at the intra-row cutting section in the step of forming the heads.

Other and further objects, features and advantages of the invention will appear more fully from the following description.

DETAILED DESCRIPTION OF THE PREFERRED EMBODIMENT

A preferred embodiment of the invention will now be described in detail with reference to the accompanying drawings.

Figure 1:
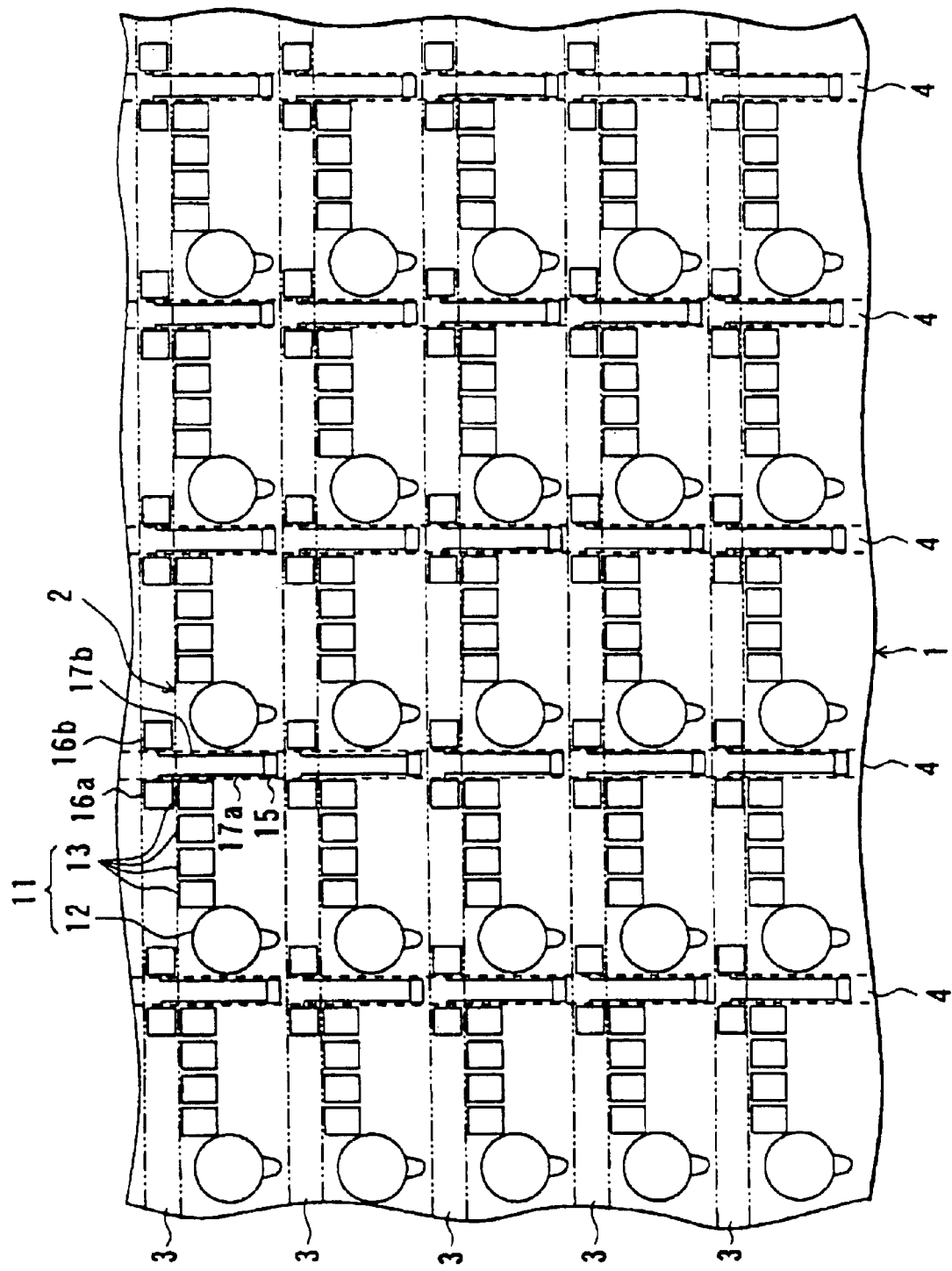
FIG. 1 is an explanatory view for illustrating part of a wafer as a thin-film magnetic head material of an embodiment of the invention.

FIG. 1 shows part of a wafer as a thin-film magnetic head material of the embodiment of the invention. In the wafer 1 a plurality of rows of head-to-be sections 2 to be thin-film magnetic heads are aligned. The wafer 1 includes inter-row cutting sections 3 each provided to be a position at which adjacent ones of the rows are to be separated and intra-row cutting sections 4 provided to be a position at which adjacent ones of the head-to-be sections are to be separated in each row.

In each head-to-be section 2 a thin-film magnetic head element 11 is formed. Each head element 11 has: an element section 12 including an induction-type magnetic transducer and an MR element; and a plurality of electrodes 13 for connecting the element section 12 to an external device.

In the wafer 11 a detection element 15 for detecting an amount of processing is formed near the medium-facing-surface-side end of each intra-row cutting section 4. In the wafer 11 electrodes 16a and 16b for monitoring are formed in each inter-row cutting section 3 for electrically connecting each detection element 15 to an external device. Furthermore, in the wafer 11 two leads 17a and 17b for monitoring are formed in each intra-row cutting section 4 as conductors for electrically connecting each detection element 15 to the respective electrodes 16a and 16b. The detection element 15 may be a resistance element whose resistance value changes in response to its dimensions.

Figure 2:
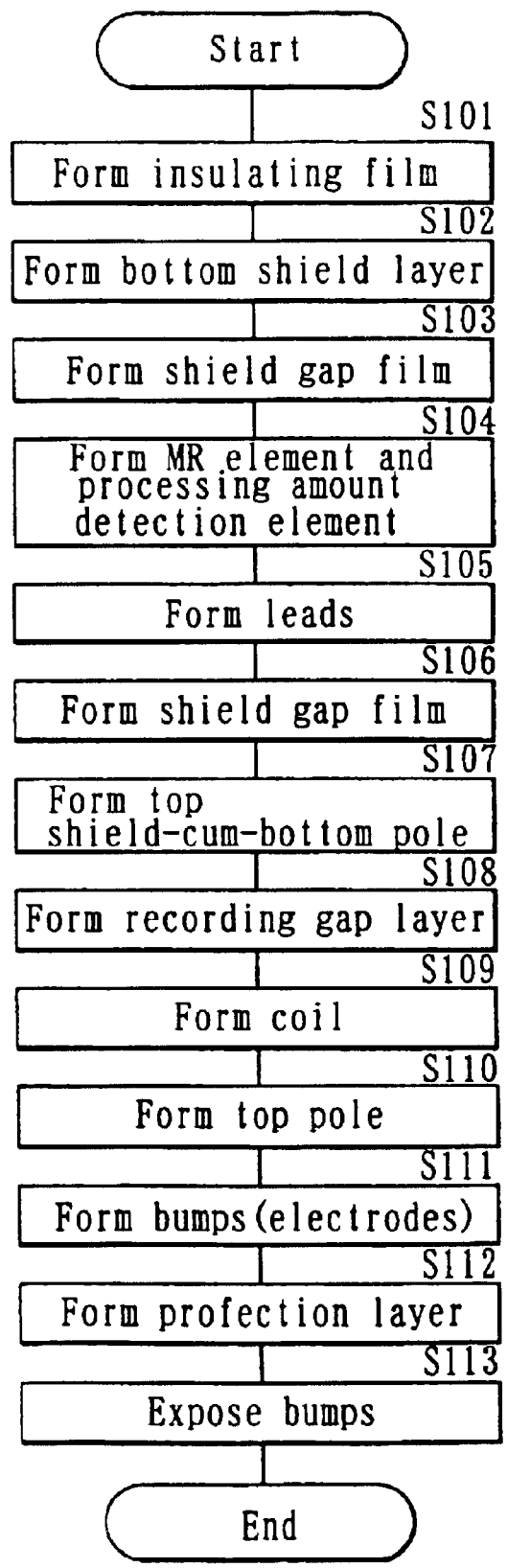
FIG. 2 is a flowchart for illustrating manufacturing steps of the wafer of the embodiment.
Figure 3:
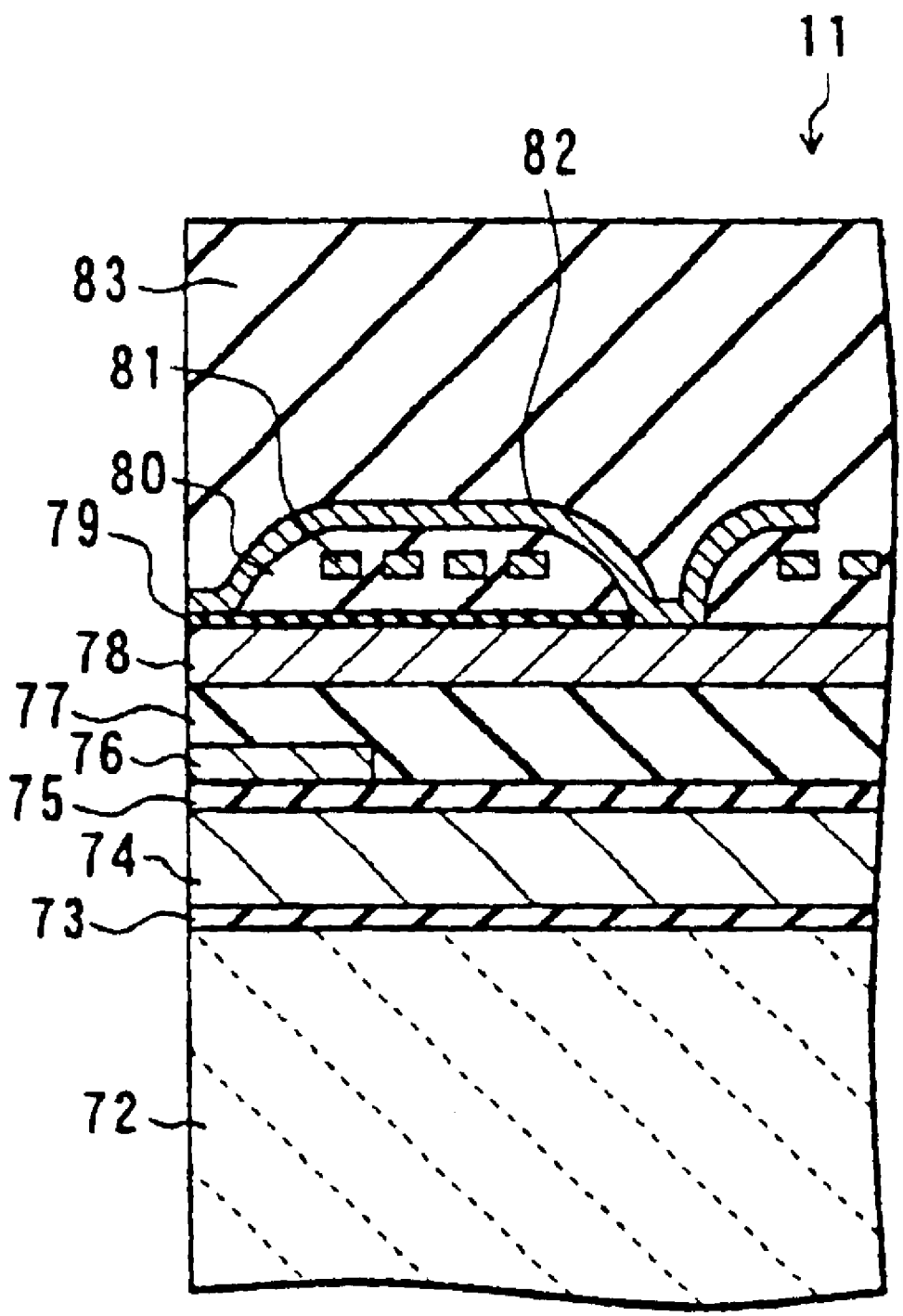
FIG. 3 is a cross section of a thin-film magnetic head element portion in the wafer of the embodiment.
Figure 4:
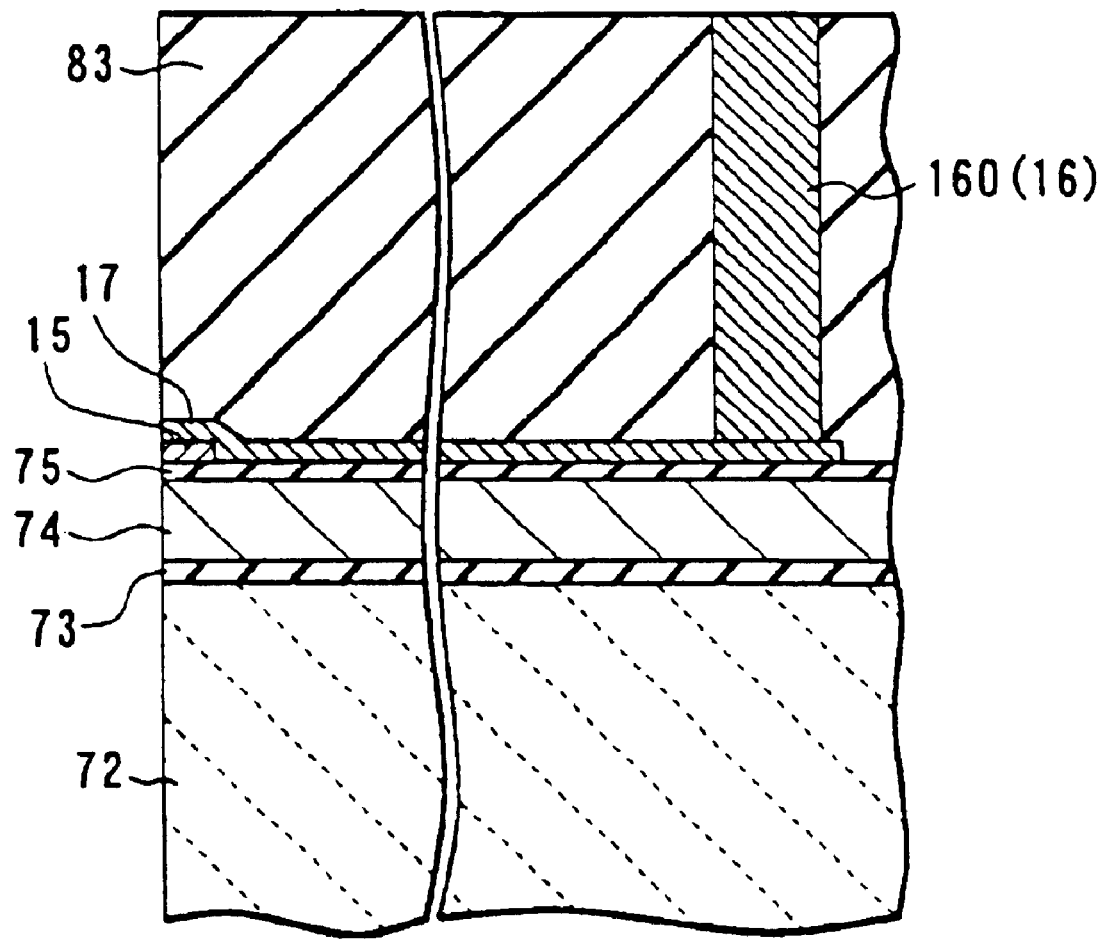
FIG. 4 is a cross section of a neighborhood of a detection element for detecting an amount of processing in the wafer of the embodiment.
Figure 5:
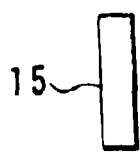
FIG. 5 is an explanatory view for illustrating a manufacturing process of the detection element, electrodes and leads for monitoring of the embodiment.
Figure 6:
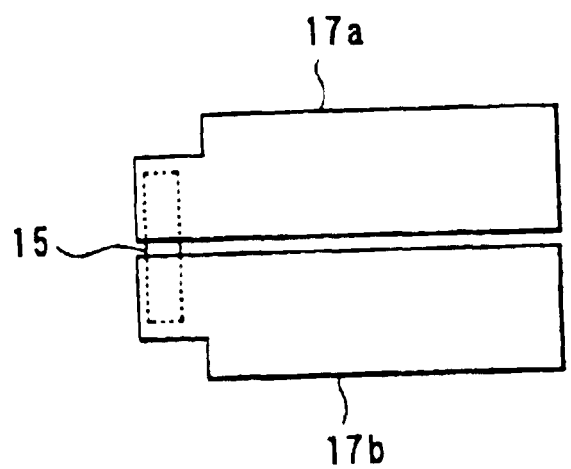
FIG. 6 is an explanatory view for illustrating the manufacturing process of the detection element, electrodes and leads for monitoring of the embodiment.
Figure 7:
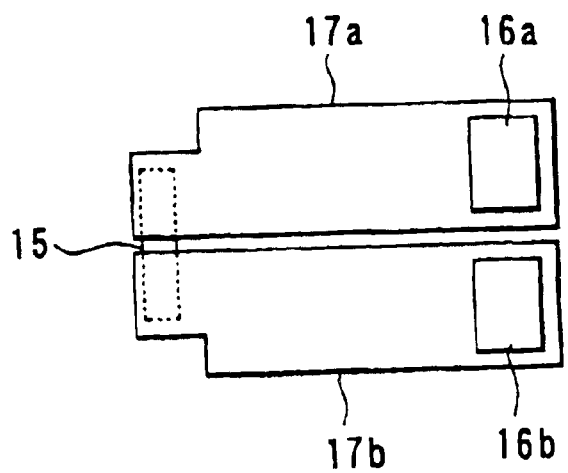
FIG. 7 is an explanatory view for illustrating the manufacturing process of the detection element, electrodes and leads for monitoring of the embodiment.

Reference is now made to FIG. 2 to FIG. 7 to describe a method of manufacturing a thin-film magnetic head material of this embodiment, that is, a method of manufacturing the wafer 1 shown in FIG. 1. FIG. 2 is a flowchart showing manufacturing steps of the wafer 1. FIG. 3 is a cross section of the thin-film magnetic head element 11 in the wafer 11. FIG. 4 is a cross section showing a neighborhood of the detection element 15 in the wafer 1. FIG. 5 to FIG. 7 show a manufacturing process of the detection element 15, the electrode 16 (that represents 16a and 16b) for monitoring and the lead 17 (that represents 17a and 17b) for monitoring.

According to the manufacturing steps of the wafer 1, an insulating film 73 made of alumina ($Al_2O_3$), for example, is formed on a substrate 72 made of aluminum oxide and titanium carbide ($Al_2O_3$—TiC), for example (step S101). Next, a bottom shield layer 74 for a reproducing head is formed on the insulating film 73 (step S102). A shield gap film 75 made of alumina, for example, is then formed on the bottom shield layer 74 (step S103). Next, an MR element 76 for reproduction is formed on the shield gap film 75. At the same time, the detection elements 15 is formed on the shield gap film 75, as shown in FIG. 4 and FIG. 5 (step S104).

Next, two leads (not shown) are formed on the shield gap film 75 and the MR element 76 such that one end of each of the leads is connected to the MR element 76. At the same time, as shown in FIG. 4 and FIG. 6, the two leads 17 (17a and 17b) are formed on the shield gap film 75 and the detection element 15 such that one end of each of the leads is electrically connected to the detection element 15 (step S105).

Next, a shield gap film 77 is formed on the shield gap film 75 and the MR element 76 (step S106) and the MR element 76 is embedded in the shield gap films 75 and 77. A top shield-cum-bottom pole 78 is then formed on the shield gap film 77 (step S107). Next, a recording gap layer 79 made of alumina, for example, is formed on the top shield-cum-bottom pole 78 (step S108). A thin-film coil 81 is formed in a photoresist layer 80 on the recording gap layer 79 (step S109). Next, a top pole 82 is formed on the photoresist layer 80 (step S110). A rear portion of the top pole 82 (on the right side of FIG. 3) is in contact with the bottom pole 78 and magnetically coupled thereto.

Next, a bump (an electrode) not shown that is connected to the MR element 76 and a bump not shown that is connected to the thin-film coil 81 are formed. At the same time, as shown in FIG. 4 and FIG. 7, bumps 160 to be the electrodes 16 (16a and 16b) for monitoring are formed such that bottom ends of the bumps 160 are electrically connected to the leads 17 (17a and 17b) for monitoring (step S111). Next, a protection layer 83 made of alumina, for example, is formed to cover the top pole 82 (step S112). The bumps are covered with the protection layer 83. Finally, the top surface of the protection layer 83 is polished and the bumps are exposed (step S113).

Figure 8:
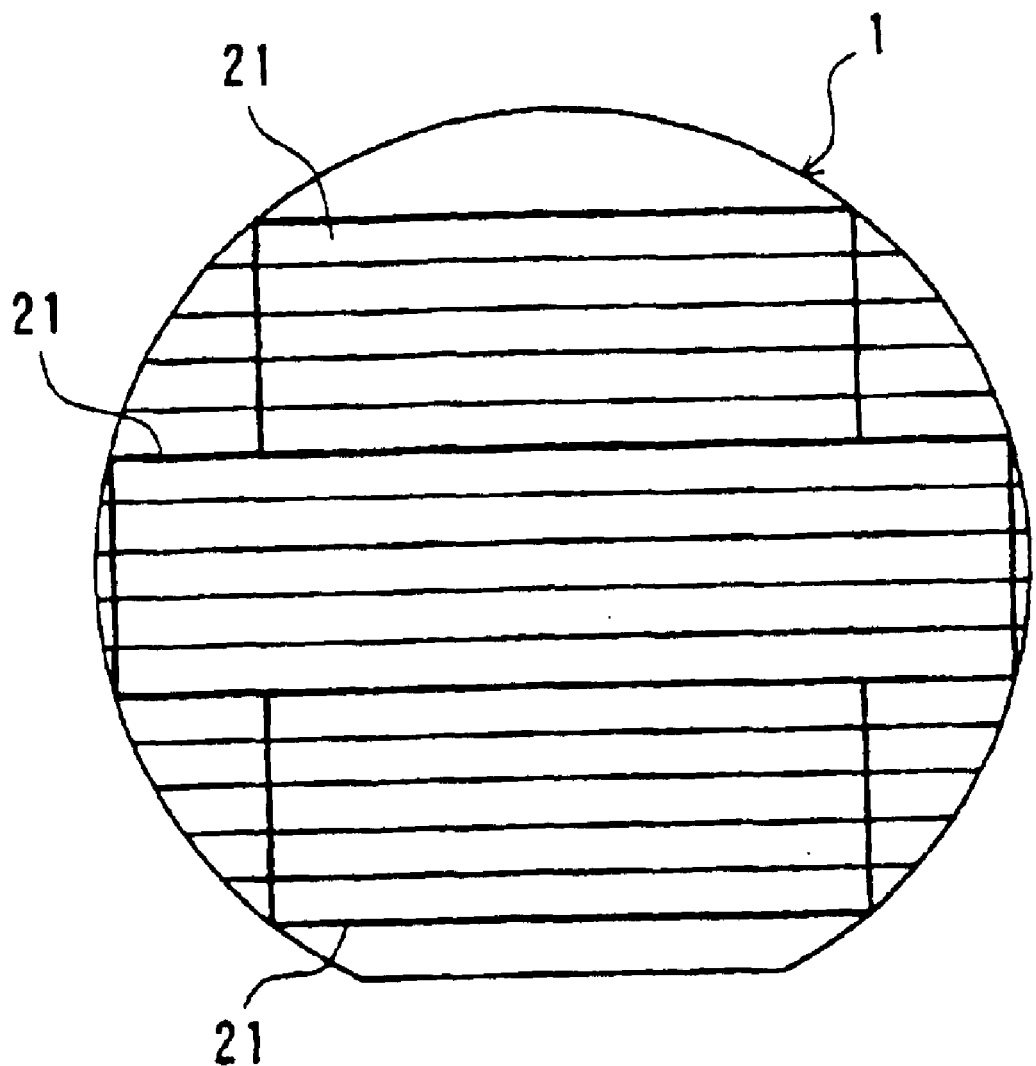
FIG. 8 is an explanatory view for illustrating the wafer and a wafer block.

A method of manufacturing thin-film magnetic heads of the embodiment will now be described. A first step of the method is to fabricate the wafer 1, which is described above. In the method of manufacturing thin-film magnetic heads, a specific processing is then performed on the head-to-be sections 2 in the wafer 1. In this embodiment this processing is performed through the use of a wafer block 21 separated from the wafer 1 as shown in FIG. 8. The wafer block 21 includes a plurality of rows of head-to-be sections 2 and the inter-row cutting sections 3 and the intra-row cutting sections 4. Therefore, the wafer block 21 corresponds to the thin-film magnetic head material of the invention, too.

The method of manufacturing thin-film magnetic heads includes: a processing step for performing the specific processing on the wafer block 21 while monitoring an output signal of the detection element 15 that is obtained through the electrode 16; a head aggregate forming step for forming a head aggregate (that may be called a bar) in which a row of head-to-be sections 2 are aligned by cutting the wafer block 21 having gone through the processing step at the inter-row cutting sections 3; and a head forming step for forming thin-film magnetic heads by cutting the head aggregate obtained through the head aggregate forming step at the intra-row cutting sections 4.

Figure 9A:
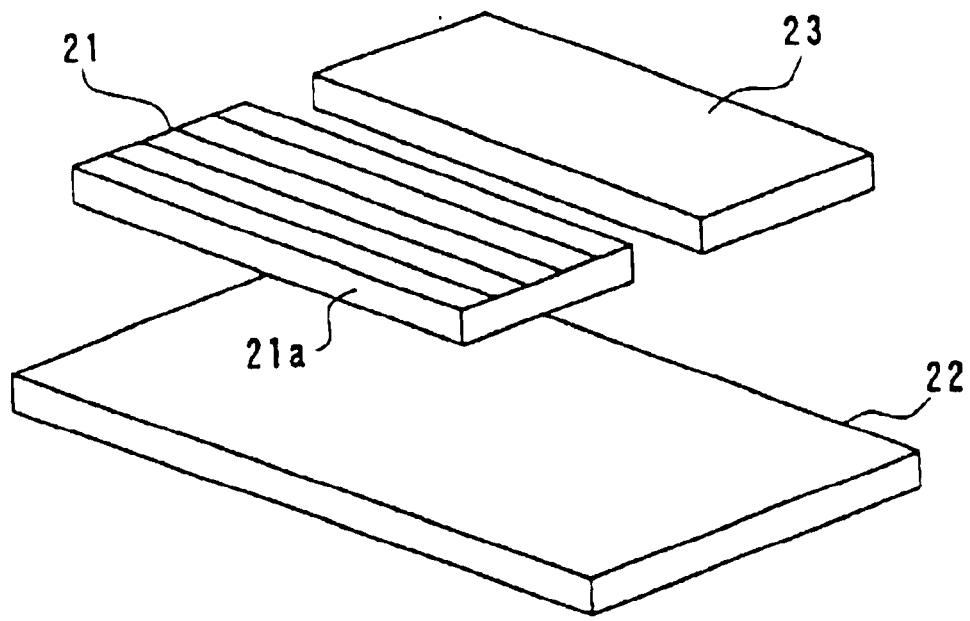
FIG. 9A and FIG. 9B are perspective views for illustrating the step of joining the wafer block to a support plate of the embodiment.
Figure 9B:
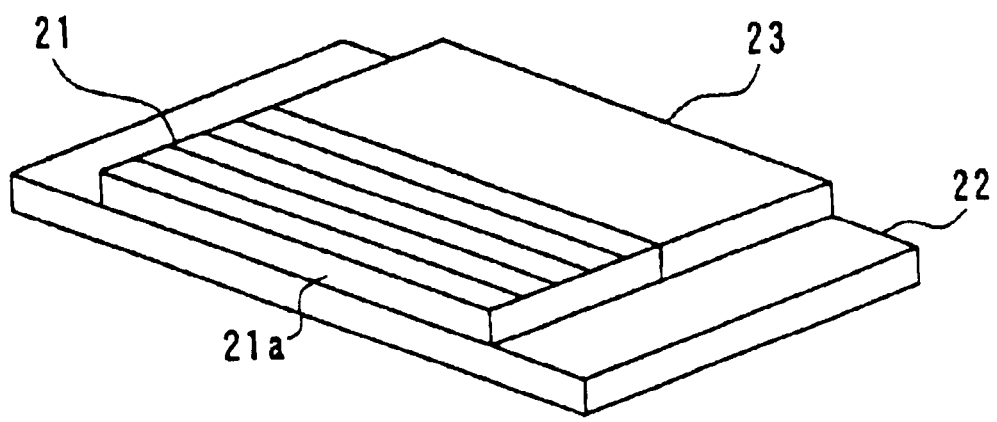

Reference is now made to FIG. 9A and FIG. 9B, and FIG. 10 to FIG. 12 to describe the steps mentioned above. First, before the processing step, as shown in FIG. 9A, the wafer block 21, a support plate 22 for supporting all the head-to-be sections of the wafer block 21, and a dummy block 23 for assisting in supporting the wafer block 21 are prepared and they are joined to one another as shown in FIG. 9B. To be specific, the wafer block 21 is placed on the support plate 22 such that the surface of the wafer block 21 including surfaces of all the head-to-be sections faces the top surface of the support plate 22. On the support plate 22, the dummy block 23 is placed on the side of the wafer block 21 opposite to a medium facing surface 21a. The surface of the wafer block 21 and the surface of the support plate 22 facing each other, the surface of the wafer block 21 and the surface of the dummy block 23 facing each other, and the surface of the dummy block 23 and the surface of the support plate 22 facing each other, are bonded to each other with an adhesive, respectively. When joined to the support plate 22, the wafer block 21 is placed such that the surface opposite to the surface in which the head elements 11 are formed faces the support plate 22.

In the processing step, specific processing is performed on the medium facing surfaces of a row of head-to-be sections in the medium facing surface 21a of the wafer block 21 joined to the support plate 22. In this step, grinding using a grinding apparatus, lapping using a lapping apparatus and so on are performed. The MR height and the throat height are thereby precisely defined.

Figure 10:
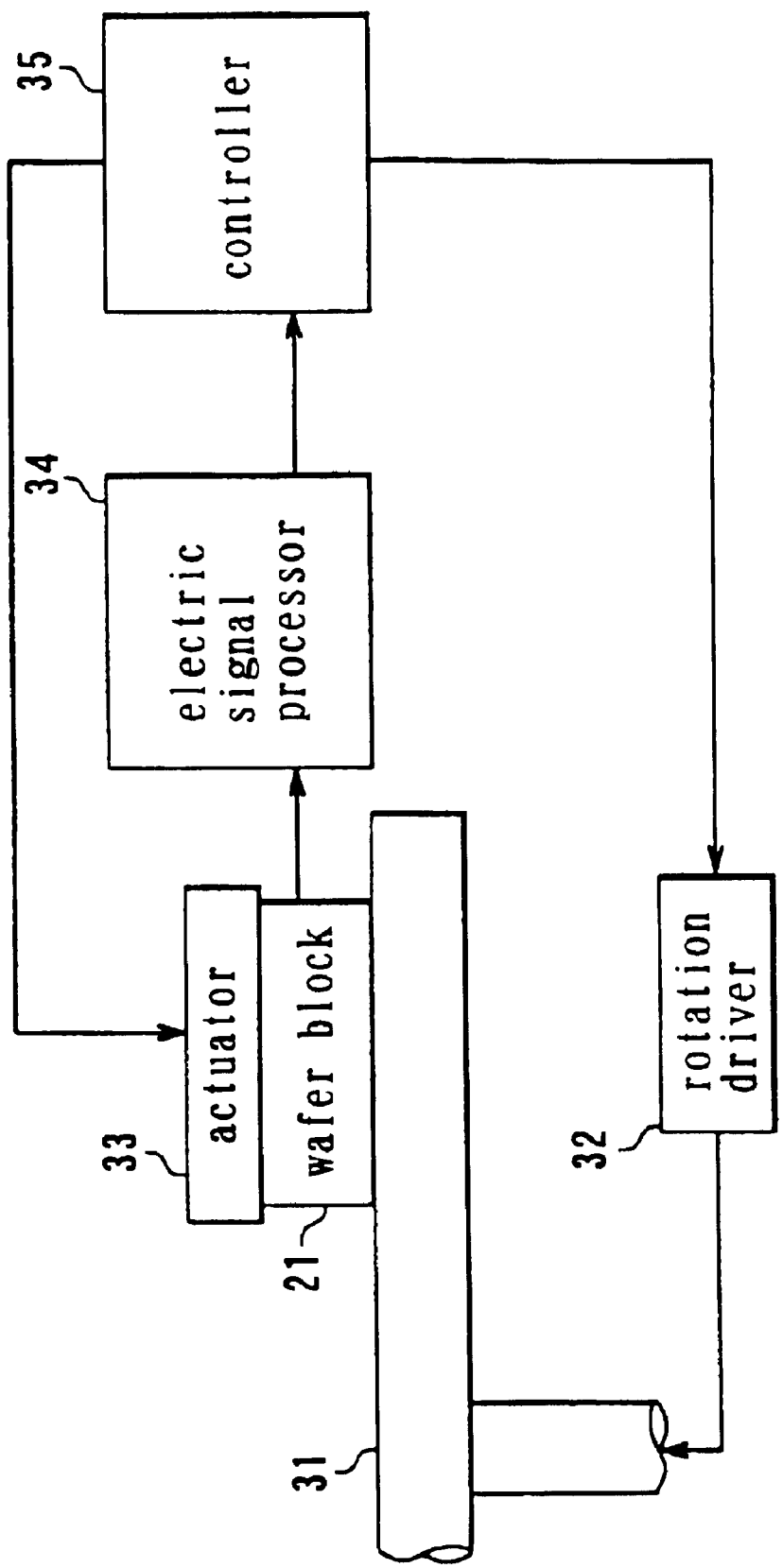
FIG. 10 is a block diagram of an example of a lapping apparatus of the embodiment.

FIG. 10 is a block diagram showing an example of the configuration of a lapping apparatus. The apparatus comprises: a lapping plate 31; a rotation driver 32 for driving the lapping plate 31 to rotate; an actuator 33 for holding the wafer block 21 such that the position of the block 21 is changeable on the lapping plate 31 and for allowing adjustment of pressure applied to each part of the wafer block 21; an electric signal processor 34 for receiving an output signal of each detection element 15 obtained through the electrodes 16 in a row located in the medium facing surface of the wafer block 21 and for performing specific processing on the signal to output; and a controller 35 for controlling the rotation driver 32 and for receiving the output signal of the processor 34 and controlling the actuator 33 in response to the output signal.

In the lapping apparatus the controller 35 monitors an output signal of each detection element 15 obtained through the electrodes 16, and adjusts pressure applied to each part of the wafer block 21 in response to the output signal. Through this operation the medium facing surface of the wafer block 21 is lapped while the straightness of the pattern of the thin-film magnetic head elements located in the medium facing surface of the wafer block 21. The MR heights and throat heights of the head elements in the row are precisely defined.

Next, in the head aggregate forming step, the wafer block 21 and the support plate 22 are cut together at the inter-row cutting section 3 such that the head aggregate including the row of head-to-be sections whose medium facing surfaces have received the specific processing is separated from the wafer block 21. The wafer block 21 and the support plate 22 having been cut and the head aggregate having been obtained, processing of the medium facing surface and cutting of the wafer block 21 and the support plate 22 are repeated as long as the wafer blocks 21 remain. Processing markers that indicate the inter-row cutting sections 3 are provided on the surface of the wafer block 21 in which the thin-film magnetic head elements are formed. The cutting position is determined with reference to the marker when the wafer block 21 and the support plate 22 are cut.

Figure 11:
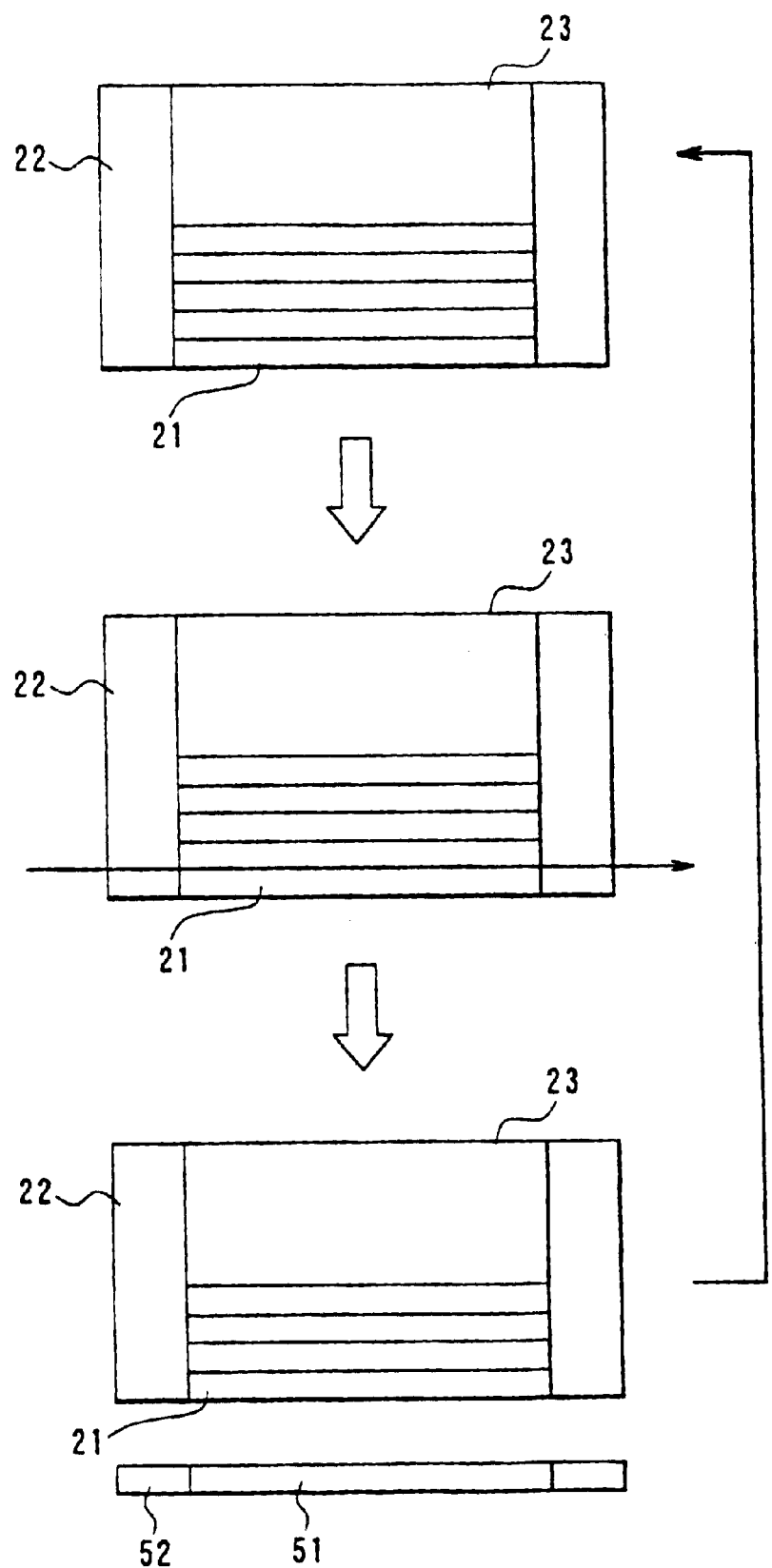
FIG. 11 is an explanatory view for illustrating repetition of a processing step and a head aggregate forming step of the embodiment.

FIG. 11 illustrates repetition of the processing step and the head aggregate forming step described above. The top figure of FIG. 11 illustrates processing of the medium facing surface of the wafer block 21 bonded to the support plate 22. This processing having completed, the wafer block 21 and the support plate 22 are cut together so that the head aggregate including the row of head-to-be sections whose medium facing surfaces have been processed are separated from the wafer block 21, as shown in the figure in the middle of FIG. 11. The head aggregate 51 and the piece 52 of the support plate 22 thereby obtained are transferred to the post-step, as shown in the bottom figure of FIG. 11. If any wafer block 21 remains, processing of the medium facing surface is repeated as shown in the top figure of FIG. 11.

Next, the head aggregate 51 and the piece 52 of the support plate 22 are separated from each other. Rails are formed in the medium facing surface of the head aggregate 51.

Figure 12:
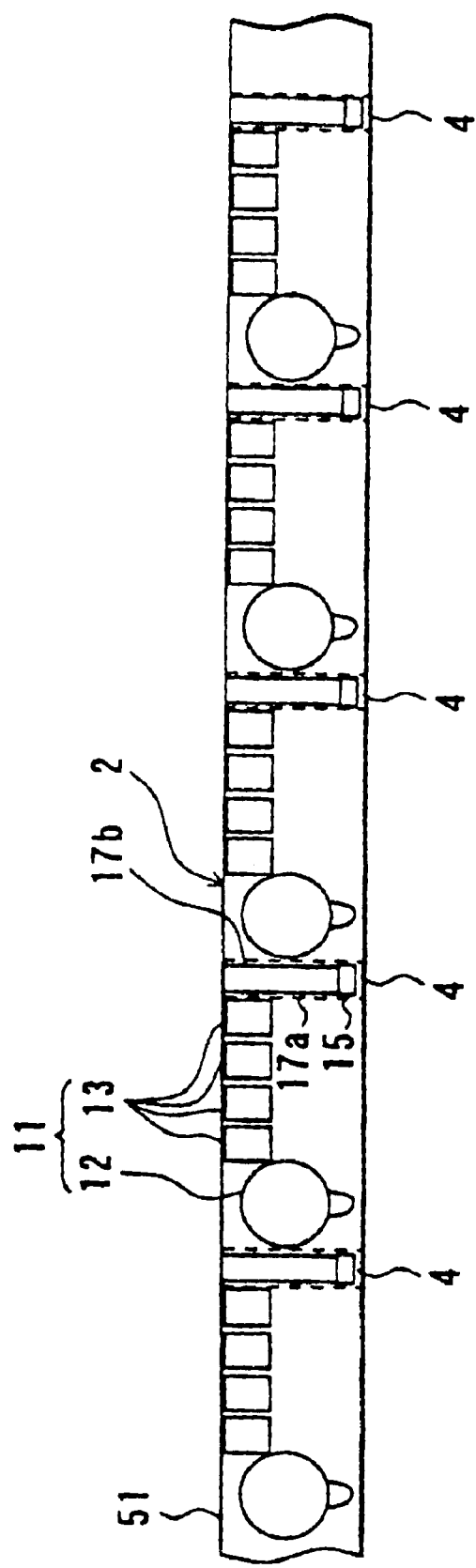
FIG. 12 is an explanatory view for illustrating the step of forming thin-film magnetic heads of the embodiment.
Figure 13:
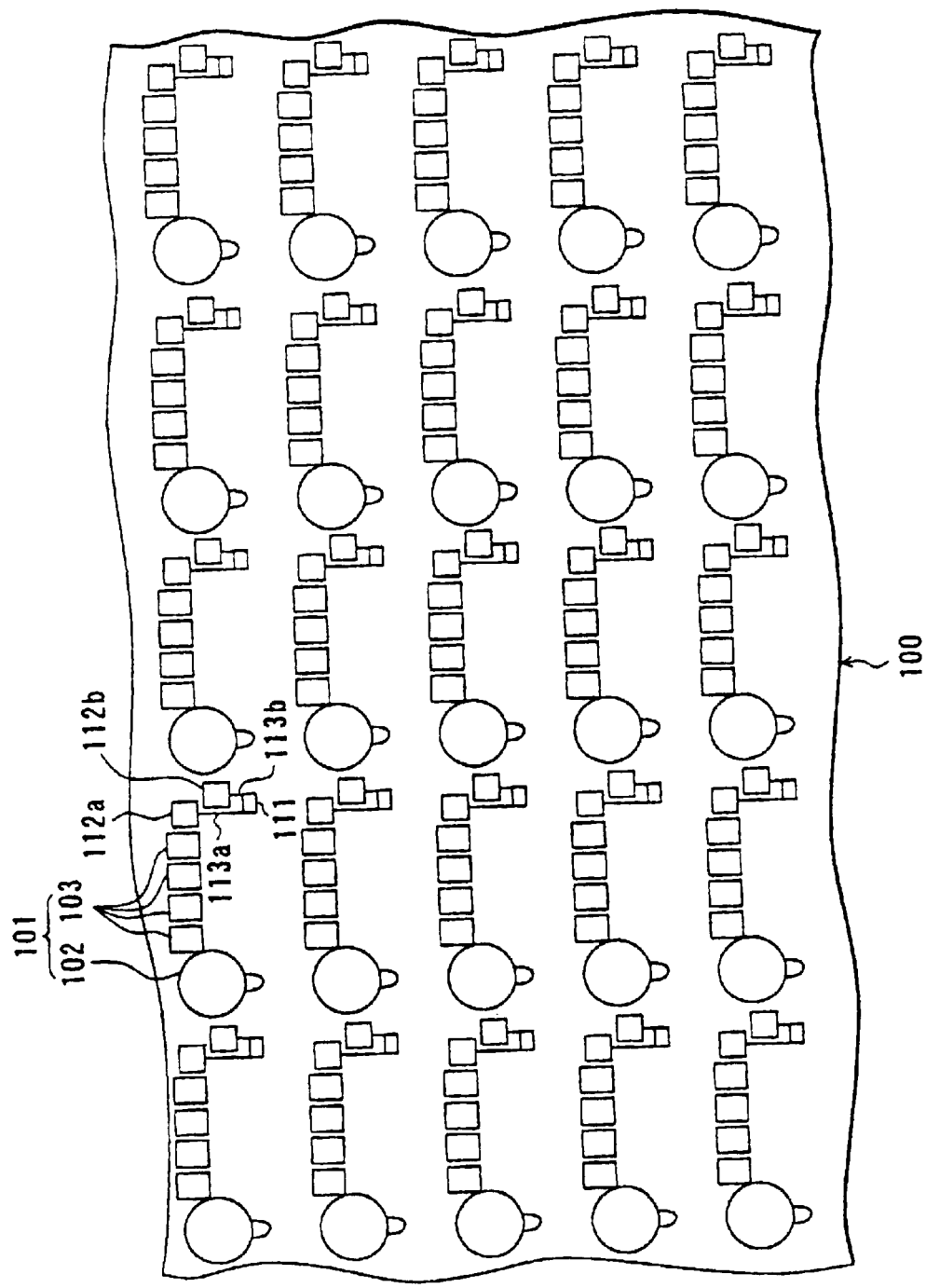
FIG. 13 is an explanatory view for illustrating an example of arrangement of detection elements for detecting an amount of processing, electrodes and leads for monitoring in a wafer used for manufacturing thin-film magnetic heads of related art.
Figure 14:
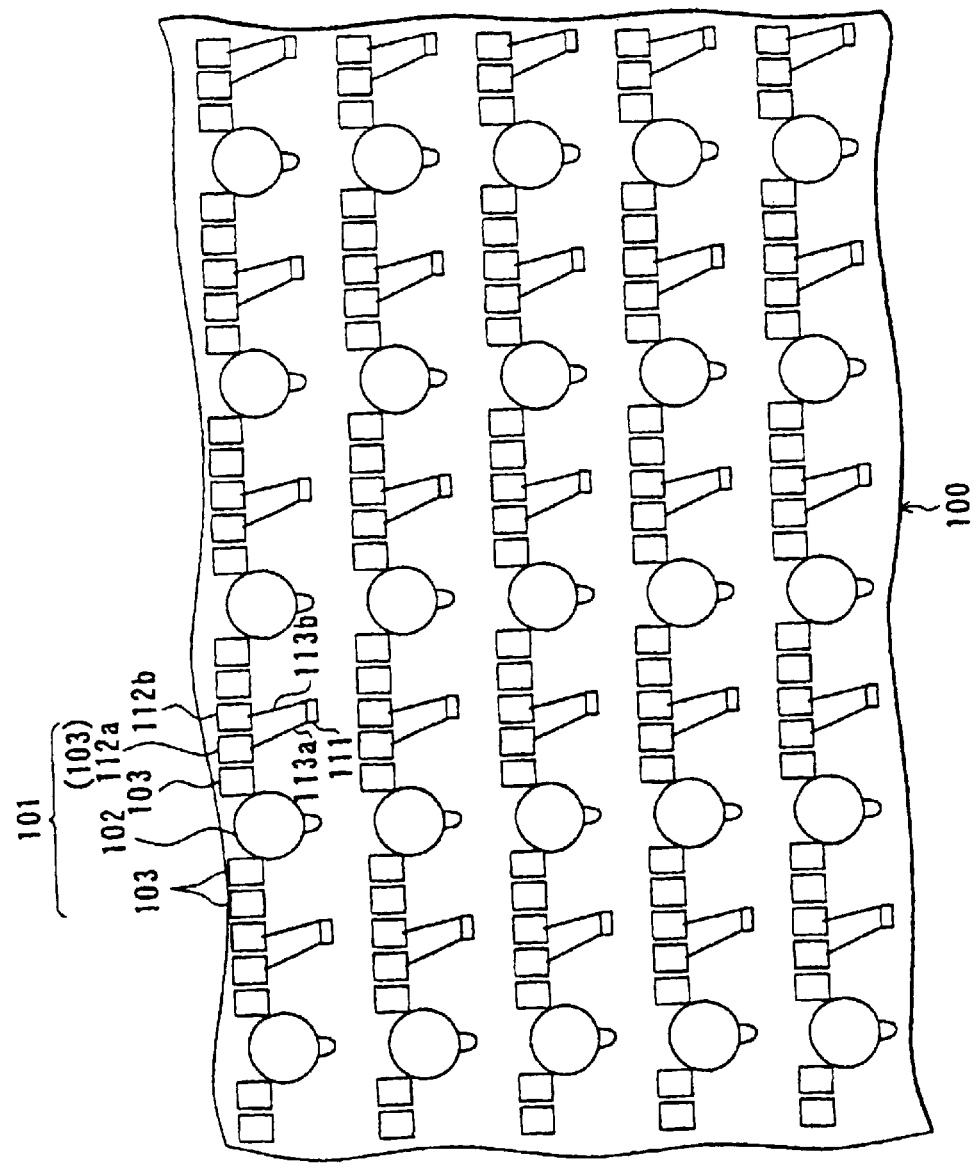
FIG. 14 is an explanatory view for illustrating another example of arrangement of detection elements, electrodes and leads for monitoring in a wafer used for manufacturing thin-film magnetic heads of related art.

Next, in the thin-film magnetic head forming step as shown in FIG. 12, the head aggregate 51 is cut at the intra-row cutting sections 4 to separate the head-to-be sections 2 from one another. Thin-film magnetic heads are thus obtained.

According to the embodiment described so far, the electrodes 16 for monitoring connected to the detection elements 15 are formed in the inter-row cutting sections 3 in the wafer 1. As a result, the pitch of the head-to-be sections 2 in each row is reduced while high-precision processing is achieved through the detection elements 15 for detecting an amount of processing. The number of thin-film magnetic heads obtained is thus increased.

According to the embodiment, the detection elements 15 and the leads 17 for monitoring are formed in the intra-row cutting sections 4. As a result, it is possible to manufacture thin-film magnetic heads in which the leads 17 connected to the detection elements 15 do not remain. It is therefore possible to prevent the adverse effects such as the leads catching noises or causing static damage.

The invention is not limited to the embodiment described above but may be practiced in still other ways. For example, in the embodiment, the wafer block 21 separated from the wafer 1 is bonded to the support plate 22 together with the dummy block 23. In this state, processing on the medium facing surface and cutting of the head aggregate are performed. Alternatively, the end face of the wafer block 21 opposite to the medium facing surface may be bonded to a specific jig and processing on the medium facing surface and cutting of the head aggregate may be performed. Another alternative is to perform processing on the medium facing surface and cutting of the head aggregate in the state of the wafer 1.

According to the thin-film magnetic head material, the method of manufacturing the same, or the method of manufacturing thin-film magnetic heads of the invention described so far, the electrode connected to the detection element for detecting an amount of processing are formed in the inter-row cutting section. As a result, the pitch of the head-to-be sections in each row is reduced and the number of thin-film magnetic heads obtained is increased.

According to the thin-film magnetic head material, the method of manufacturing the same, or the method of manufacturing thin-film magnetic heads of the invention, the detection element and the conductor may be formed in the intra-row cutting section. In this case, it is possible to manufacture thin-film magnetic heads in which the conductor connected to the detection element does not remain.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin-film magnetic head material, the head material including: a plurality of rows of head-to-be sections to be thin-film magnetic heads; an inter-row cutting section provided to be a position between adjacent ones of the rows that are to be separated; and an intra-row cutting section provided to be a position between adjacent ones of the head-to-be sections in each of the rows that are to be separated; the method comprising:

providing a detection element to be used for detecting an amount of processing when specific processing is performed on the head material; an electrode for electrically connecting the detection element to an external device; and a conductor for electrically connecting the electrode to the detection element, wherein:

the detection element is not disposed in the inter-row cutting section but disposed in each of the rows; and the electrode is not disposed in each of the rows but disposed in the inter-row cutting section.

2. The method according to claim 1, wherein the detection element and the conductor are formed in the intra-row cutting section.

* * * * *